US006927561B1

(12) United States Patent
Schottler

(10) Patent No.: US 6,927,561 B1
(45) Date of Patent: Aug. 9, 2005

(54) CURRENT MEASURING CIRCUIT FOR A PWM DRIVER AND METHOD OF USING THE SAME

(75) Inventor: Joseph J. Schottler, Crystal, MN (US)

(73) Assignee: Sauer-Danfoss, Inc., Minneapolis, MN (US)

(*) Notice: Subject to any disclaimer, the term of this patent is extended or adjusted under 35 U.S.C. 154(b) by 0 days.

(21) Appl. No.: 10/751,313

(22) Filed: Jan. 2, 2004

(51) Int. Cl.[7] .............................................. G01R 31/28
(52) U.S. Cl. ................................... 324/117 R; 324/126
(58) Field of Search ............................ 324/117 R, 118, 324/126, 139, 140 R, 158.1; 318/599; 327/26, 327/36

(56) References Cited

U.S. PATENT DOCUMENTS

| 5,436,545 A | | 7/1995 | Bahr et al. | |
|---|---|---|---|---|
| 5,629,616 A | * | 5/1997 | Weggel | 324/127 |
| 5,631,817 A | | 5/1997 | Minami | |
| 5,710,495 A | | 1/1998 | Skelton | |
| 6,320,370 B1 | * | 11/2001 | Weggel | 324/117 R |
| 6,804,131 B2 | * | 10/2004 | Galbiati et al. | 363/132 |

* cited by examiner

Primary Examiner—Minh N. Tang

(57) ABSTRACT

A current measuring circuit for a PWM driver. The current measuring device measures the high side and low side currents of a PWM driver circuit before the currents reach the driver. A first measuring circuit measures the high side of the circuit and a second measuring circuit measures the low side of the circuit. The second measuring circuit also receives a signal from the first measuring circuit containing the current measurement measured by the first circuit and the second circuit then adds this current to the second circuit current and transmits a signal of the summed currents to a receiving device.

9 Claims, 1 Drawing Sheet

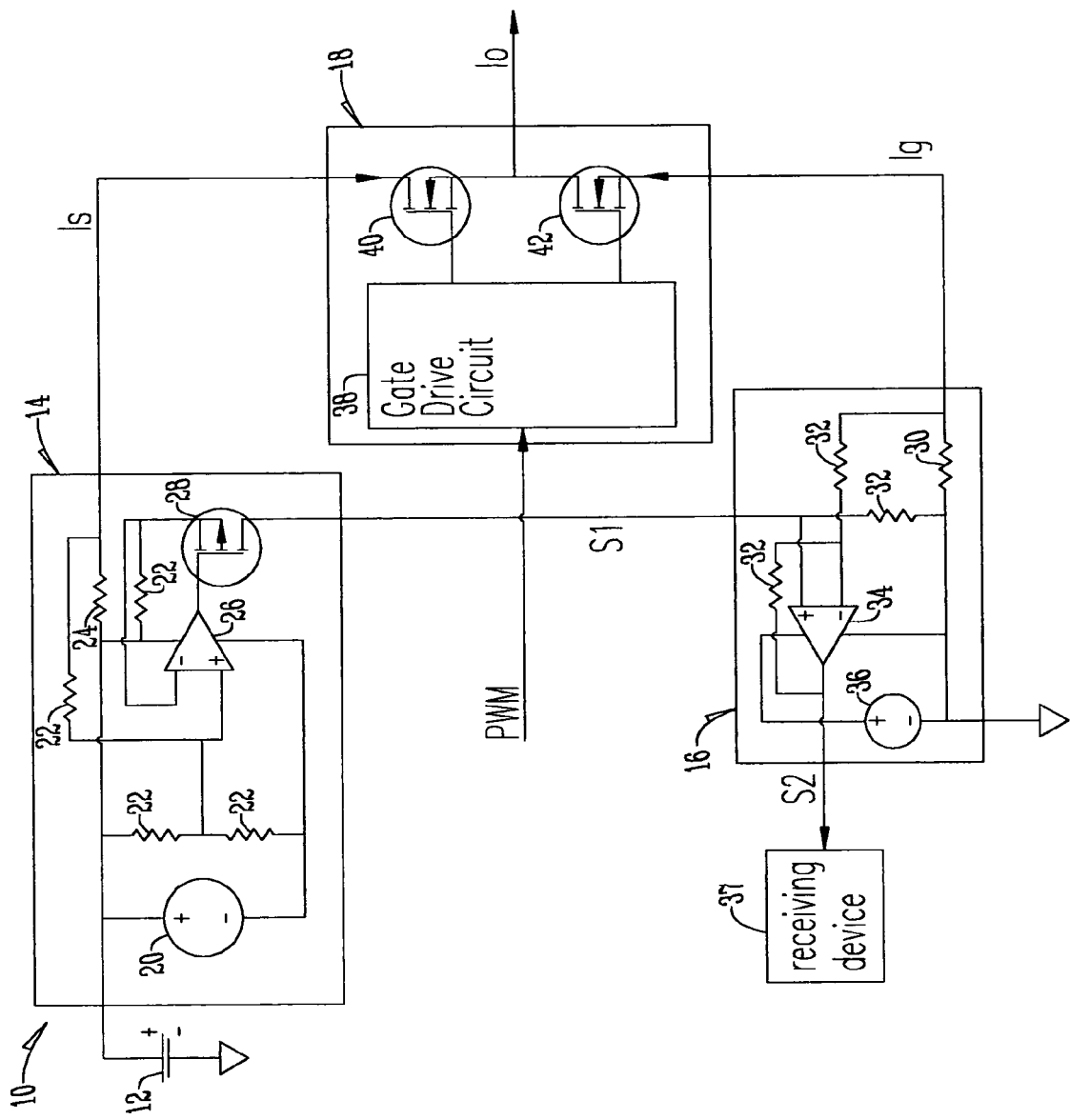

CURRENT MEASURING CIRCUIT FOR A PWM DRIVER AND METHOD OF USING THE SAME

BACKGROUND OF THE INVENTION

PWM (pulse width modulator) drivers are often used to drive electromagnetic actuators or devices with coils. The PWM driver is attractive because it can effectively drive heavy and inductive loads with little power loss in the driver throughout the entire control range (0–100% duty cycle).

When operating, the coil acts on some mechanical object by means of a magnetic field created by a current in the coil. The magnitude of the magnetic field is directly proportional to the current in the coil so it is important to control or monitor this current. The magnitude of the current can be predicted by dividing the average voltage across the coil by an assumed coil resistance. Unfortunately, because the coil resistance is a strong function of temperature and temperature can change dramatically as the coil is being driven, this prediction is often insufficient.

Several methods of measuring the current being driven into a coil from a PWM driver have been used. Most of these methods suffer by being inaccurate or costly. For example, one typical approach is to take a PWM driver circuit, typically a half bridge circuit built with MOSFETs (metal oxide semi conductor field effect transistors) or other transistors, and placing a current measuring circuit after the PWM driver circuit in series to measure the output of the PWM driver circuit. Because the measuring circuit is in series with the output of the PWM driver circuit and because the PWM driver circuit is a PWM driver, the measuring circuit must measure the current accurately as the voltage on the output signal is constantly being switched from ground to source voltage. The measuring circuit must also transmit this information back to a receiving device. The receiving device is typically a micro controller and typically referenced to ground, so the measuring circuit needs to reject the wide common mode voltage swing and measure only the current in the output signal and feed this back to a monitoring or controlling device referenced to the ground of the receiving device. Because of all these variables, measuring circuits are typically extremely costly to design and produce inaccurate results.

Therefore, there is a need in the art to provide for a current measuring circuit for a PWM driver that is both inexpensive to design and accurate in its measurements. There is a further need to minimize the effects to a current measuring system attempting to measure an output signal that is constantly being switched from ground to source as in a PWM driver.

Thus, it is a primary object of the present invention to provide a current measuring circuit for a PWM driver that improves upon the state of the art.

Another object of the present invention is to provide a method of measuring the current of a PWM driver using a measuring circuit that will not be affected by the constant switching of ground to source voltage of the PWM driver.

Yet another object of the present invention is to provide a current measuring circuit for a PWM driver that will be inexpensive to create and produce an accurate measurement.

Another object of the present invention is to measure the current supplied to a PWM driver that drives a coil of an electrohydraulic valve.

These and other objects, features, or advantages of the present invention will become apparent from the specification and claims.

BRIEF SUMMARY OF THE INVENTION

The present invention is a circuit for measuring the current within a PWM driver and method of using the same. The circuit is comprised of a voltage source for the PWM driver that produces a high side current and a low side current within the circuit. The current measuring device of the circuit is unique in that it is located before the PWM driver. The circuit for measuring the current consists of a first measuring circuit that determines the current of the high side of the circuit and then takes this information and sends a signal to a second measuring circuit. The second measuring circuit determines the current within the low side of the circuit and adds this current information to the information in the signal sent from the high side measuring circuit and produces an output signal that is sent to a monitoring or control device.

BRIEF DESCRIPTION OF THE DRAWINGS

The FIGURE is a schematic diagram of the current measuring circuit of the present invention.

DESCRIPTION OF THE PREFERRED EMBODIMENTS OF THE INVENTION

The FIGURE shows the current measuring circuit 10 of the present invention. The circuit 10 comprises a source voltage 12, a first measuring circuit 14, a second measuring circuit 16, and a PWM (pulse width modulator) driver 18. The first measuring circuit 14 is comprised of a power source 20, a plurality of measuring circuit resistors 22 and source resistor 24 electrically connected to the power source 20 and diode 26, and a transistor 28 electrically connected to the diode 26. The second measuring circuit 16 is comprised of a source resistor 30, a plurality of measuring circuit resistors 32 electrically connected to a diode 34 that is electrically connected to a power source 36 and a receiving device 37. The PWM driver 18 consists of a gate drive circuit 38 that is electrically connected to second and third transistors 40 and 42 respectively.

In operation, current is sourced by voltage source 12 when the PWM driver 18 is in its ON state and sourced by a ground when the PWM driver is in its OFF state. The current continues to flow during the OFF state because of the inductance in a load coil (not shown). Both the high side current ($I_s$) and the low side ($I_g$) current must be measured and added together to capture all the current going into the coil. Therefore, measuring circuit 14 measures the current ($I_s$) and transmits this value to the second measuring circuit 16 via signal $S_1$. The second measuring circuit 16 measures the current ($I_g$) and adds this to the signal $S_1$ and transmits the result via $S_2$ to the receiving device 37 for monitoring or control.

One should appreciate that the FIGURE shown is the preferred embodiment of this invention. In this preferred embodiment the power sources 20 and 36 are three volt power sources that could be realized with linear regulators powered from the supply voltage 12. The cost saving becomes most significant when there are several of these output stages on one device and the regulators are shared among a plurality of current measuring circuits. Furthermore, in a preferred embodiment the resistors 22 and/or the resistors 32 have the same value of resistance. It should also be appreciated that the OP amps shown in this FIGURE are of low cost and do not use special features like as high common mode rejection ratio or precision output offset voltage. Additionally, because the current is measured before it enters into the PWM driver, the constant switching of source to ground is eliminated, thus providing for a more accurate reading. It should also be appreciated that in a preferred embodiment the method of measuring current described is used to measure the current supplied to a PWM driver that drives a coil of an electrohydraulic valve. Therefore, all of the objects of the present invention have been achieved.

It will be appreciated by those skilled in the art that other various modifications could be made to the device without the parting from the spirit in scope of this invention. All such modifications and changes fall within the scope of the claims and are intended to be covered thereby.

What is claimed is:

1. A method of measuring the current within a PWM driver steps comprising:
    providing a source current to the PWM driver creating a high side current and a low side current;
    measuring the high side current with a first circuit;
    transmitting the measurement from the first circuit to a second circuit via a first signal;
    measuring the low side current with the second circuit;
    adding the low side current measurement to the first signal to create a second signal; and
    transmitting the second signal to a receiving device.

2. The method of claim 1 wherein the receiving device is a monitoring device.

3. The method of claim 1 wherein the receiving device is a control.

4. The method of claim 1 wherein the first circuit consists of a plurality of resistors electrically connected to a circuit power source, a first diode electrically connected to the plurality of resistors; and a first transistor adapted to transmit an output signal.

5. The method of claim 4 wherein the second circuit consists of a plurality of resistors electrically connected to a circuit power source and the first transistor; a second diode electrically connected to the plurality of resistors of the second circuit and adapted to add the output signal of the first circuit to the output current of the second circuit to create the second signal.

6. The method of claim 1 wherein the PWM driver consists of a gate driving circuit electrically connected to a first transistor and a second transistor.

7. A circuit for measuring the current within a PWM driver comprising:
    a voltage source for the PWM driver electrically connected to a first circuit;
    said voltage source creating a high side current and a low side current within the circuit;
    mean in the first circuit to measure the current within the high side current of the circuit and to transmit a first signal containing this current measurement;
    a second circuit electrically connected to the first circuit via the first signal and adapted to measure the current within the low side current of the circuit;
    said second circuit being capable of adding the current from the first signal with the current measured by the second circuit to create a second signal; and
    a receiving means for receiving the second signal.

8. The circuit of claim 7 wherein the receiving means is a monitoring device.

9. The circuit of claim 8 wherein the receiving means is a control device.

* * * * *